United States Patent
Gellert et al.

[19]

[11] Patent Number: 5,820,899
[45] Date of Patent: Oct. 13, 1998

[54] INJECTION MOLDING NOZZLE WITH EDGE GATE INSERTS AND SEALING RING

[75] Inventors: Jobst Ulrich Gellert, Georgetown, Canada; Daniel A. Boehnen, Northbrook, Ill.

[73] Assignee: Mold-Masters Limited, Georgetown, Canada

[21] Appl. No.: 779,973

[22] Filed: Dec. 23, 1996

[51] Int. Cl.⁶ .................................................. B29C 45/20
[52] U.S. Cl. .................... 425/549; 264/328.15; 425/572; 425/588
[58] Field of Search .................................. 425/549, 572, 425/588; 264/328.15

[56] References Cited

U.S. PATENT DOCUMENTS

| | | |
|---|---|---|
| 3,822,856 | 7/1974 | Gellert . |
| 4,344,750 | 8/1982 | Gellert . |
| 4,557,685 | 12/1985 | Gellert ..................................... 425/549 |
| 4,705,473 | 11/1987 | Schmidt ..................................... 425/549 |
| 4,981,431 | 1/1991 | Schmidt . |
| 5,554,395 | 9/1996 | Hume et al. ............................. 425/549 |

OTHER PUBLICATIONS

Mold–Masters Limited brochure entitled "Hot Edge Gate Design" dated Jun. 1980 – p. 6.
Mold–Masters Limited brochure entitled "Injection Molding with Modular Hot Runner Systems" dated 1987 – p. 6.
Konanews dated Dec. 1995 – p. 3.

*Primary Examiner*—Tim Heitbrink
*Attorney, Agent, or Firm*—Dalesman & Company

[57] ABSTRACT

Edge gated injection molding apparatus wherein each heated nozzle has the combination of a circular sealing ring extending around it and several gate inserts, each extending radially outward from the nozzle in alignment with a gate. The sealing ring bridges an insulative air space between the heated nozzle and the surrounding wall of a well in the cooled mold to provide a sealed portion of the space around the gate inserts. The outer end of each gate insert is spaced a predetermined distance "D" from the wall of the well in which the nozzle is seated to form an opening therebetween. The opening is large enough to allow pressurized melt to flow outwardly therethrough into the sealed front portion of the space between the nozzle and the surrounding wall of the well and small enough to prevent the partially solidified melt in the sealed front portion of the space being sucked back into the melt stream during subsequent injection cycles.

2 Claims, 3 Drawing Sheets

5,820,899

INJECTION MOLDING NOZZLE WITH EDGE GATE INSERTS AND SEALING RING

BACKGROUND OF THE INVENTION

This invention relates generally to edge gated injection molding and more particularly to heated nozzle apparatus having the combination of a number of edge inserts and a sealing ring. The combination is structured to provide adequate sealing while reducing heat loss from the heated nozzle to the surrounding cooled mold.

As seen in U.S. Pat. No. 3,822,856 to Gellert which issued Jul. 9, 1974, early edge gating systems allowed the portion of the space between the heated nozzle and surrounding cooled mold in front of a sealing sleeve to fill with melt. However, this had the problem that some of the first material would continue to be sucked back out from the space to contaminate the second material for too long following colour or material changes. In order to overcome this problem, the nozzle was made to extend close enough to the mold to form a viscosity seal between them around each gate. An example of this is shown at page 6 of a Mold-Masters Limited brochure entitled "Hot Edge Gate Design" dated June 1980. While this arrangement is satisfactory for some materials, for other materials such as polyolefines it provides to much heat to the gate area which causes some of the molded products to be defective. Later, as shown at page 6 of a Mold-Masters Limited Brochure entitled "Injection Molding with Modular Hot Runner Systems" dated 1987, the distance between the nozzle and the mold was increased enough to allow the melt to fill the space in front of a sealing ring but not enough to allow the melt to be sucked back out again. While a seal is provided by a sealing ring extending around the nozzle, this arrangement has the disadvantage that the maximum size or "reach" of the nozzle at the gates must be less than the inside diameter of the sealing ring in order to allow the sealing ring to be mounted over the front end of the nozzle.

Another approach to this problem is to provide seals around each gate by having individual edge gate seals or inserts in contact with the mold as shown in U.S. Pat. No. 4,344,750 to Gellert which issued Aug. 17, 1982. While providing these individual seals at each gate works very well for some materials, they similarly provide too much heat in the gate area for other materials. Consequently, U.S. Pat. No. 4,981,431 to Schmidt which issued Jan. 1, 1991 shows individual gate seals or inserts with the seal having a sealing flange spaced around a central or nose portion which is distanced somewhat from the gate to reduce heat loss. This is similar to a KONA seal shown on page 3 of KONANEWS dated December 1995. While these edge gate inserts having sealing flanges reduce heat loss somewhat, they still allow too much heat into the area around the gate for some temperature sensitive materials.

SUMMARY OF THE INVENTION

Accordingly, it is an object of the present invention to at least partially overcome the disadvantages of the prior art by providing the combination of a sealing ring around the nozzle and individual gate inserts at each gate which are spaced from the mold enough to initially allow melt to fill the space surrounding the nozzle but do not enough to allow the melt to be sucked back into the melt stream during subsequent injection cycles.

To this end, in one of its aspect, the invention provides edge gated molding apparatus having at least one heated nozzle extending forwardly into a well in a cooled mold with an insulative space extending between at least part of the nozzle and the surrounding cooled mold. The well in the mold has a wall with a plurality of edge gates spaced therearound. Each edge gate extends outwardly to a cavity in the mold. Each nozzle having a rear end, a front end, a melt channel, and a plurality of outwardly open seats adjacent the front end of the nozzle. Each seat is radially aligned with one of the edge gates. The melt channel has a central portion extending from an inlet at the rear end of the nozzle toward the front end of the nozzle. The melt channel also has a plurality of radial portions, each radial portion branches outwardly from the central portion to one of the outwardly open seats so as to communicate with one of the edge gates. The improvement further comprises the combination of a sealing ring and a plurality of edge gate inserts. The sealing ring extends around the nozzle rearwardly from the outwardly open seats to seal a front portion of the space between the nozzle and the surrounding cooled mold against leakage of melt from said portion of said space. Each of the gate inserts is seated in one of the outwardly open seats, spaced around the cylindrical portion of the nozzle. Each gate insert has an inner end, an outer end, and a central bore extending therethrough from the inner end to the outer end of the gate insert. The central bore through the gate insert meets one of the radial portions of the melt channel through the nozzle and extends in alignment with one of the edge gates leading to said cavity in said mold to convey a stream of melt therethrough during injection. The outer end of each gate insert extends outwardly past the inner diameter of the sealing ring. The outer end of each gate insert also is spaced a predetermined distance from the wall of the well in the mold to form an opening therebetween. The opening is large enough to allow pressurized melt to flow therethrough and at least partially to solidify in the sealed front portion of the space between the nozzle and the surrounding cooled mold during the initial injection cycle. The opening is also small enough to prevent the partially solidified melt in the sealed front portion of the space being sucked back into the melt stream during subsequent injection cycles.

Further objects and advantages of the invention will appear from the following description taken together with the accompanying drawings.

DETAILED DESCRIPTION OF THE INVENTION

Figure 1:
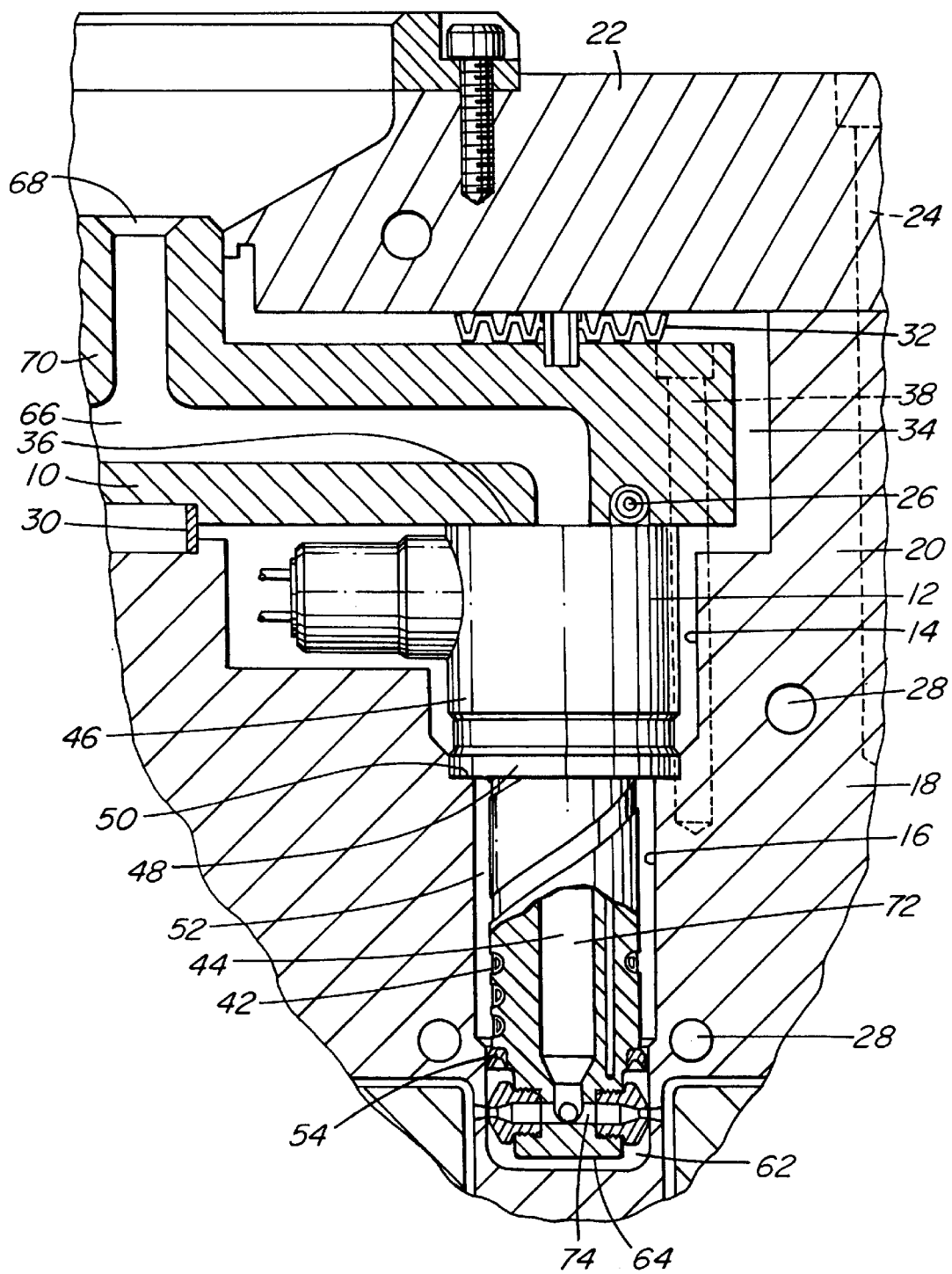
FIG. 1 is a sectional view of a portion of a multi-cavity injection molding system showing apparatus according to a preferred embodiment of the invention.

Reference is first made to FIG. 1 which shows a portion of a multi-cavity injection molding system or apparatus having a melt distribution manifold 10 interconnecting several heated nozzles 12. Each nozzle 12 is seated in a well 14 having a generally cylindrical wall 16 in a mold 18. While the mold 18 usually has a greater number of plates depending upon the application, in this case, only a cavity plate 20 and a back plate 22 which are secured together by screws 24 are shown for ease of illustration. In the configuration shown, the melt distribution manifold 10 is heated by an integral electrical heating element 26 and the mold 18 is cooled by pumping cooling water through cooling conduits 28. The melt distribution manifold 10 is mounted between the cavity plate 20 and the back plate 22 by a central locating ring 30 and a number of insulative and resilient spacers 32 to provide an insulative space 34 between the heated manifold 10 and the surrounding cooled mold 18.

Figure 2:
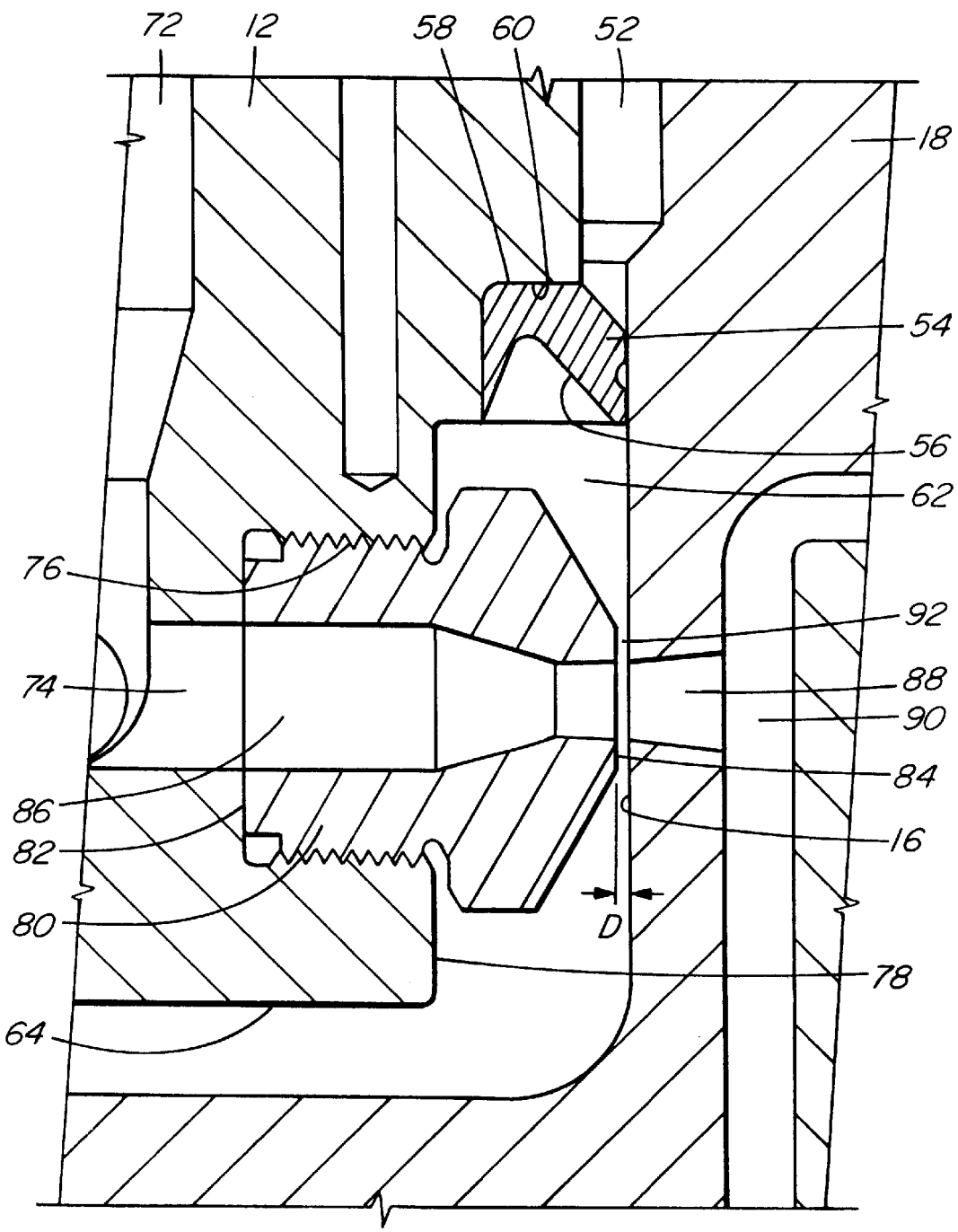
FIG. 2 is a larger sectional view of a portion of FIG. 1.
Figure 3:
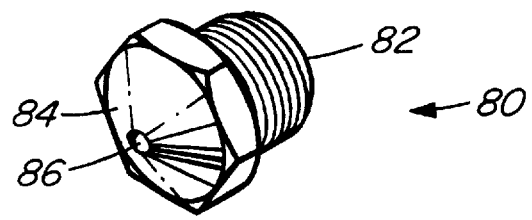
FIG. 3 is an isometric view of the gate insert shown in FIG. 2.
Figure 4:
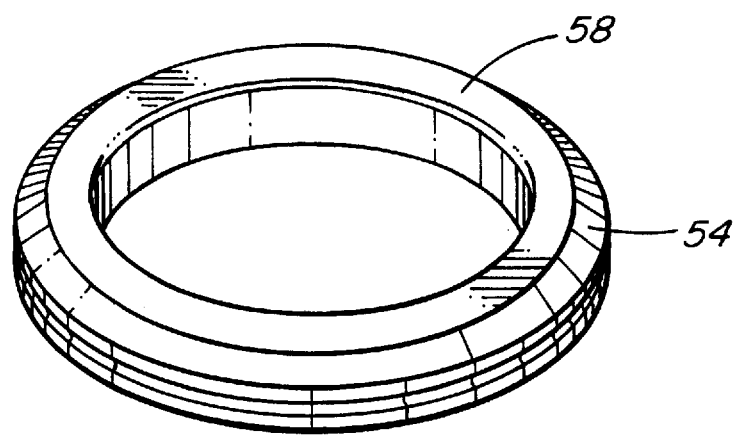
FIG. 4 is an isometric view of the sealing ring shown in FIG. 2.

The rear end 36 of each nozzle 12 is secured by screws 38 against the front face 40 of the melt distribution manifold 10. Each nozzle 12 has an integral electrical heating element 42 extending around a melt channel 44. An outer collar 46 at the rear end 36 of each nozzle 12 has a forwardly extending flange portion 48 which sits on a circular seat 50 in the mold 18 to locate the nozzle 12 and provide an insulative space 52 between the heated nozzle 12 and surrounding cooled mold 18. As best seen in FIG. 2, a circular sealing ring 54 extends around each nozzle to bridge this space 52 and provide a seal against leakage of melt. In this embodiment, the sealing ring 54 is made of a titanium alloy and has a V-shaped front surface 56 and a rear end 58 which abuts against a circular shoulder 60 extending around the nozzle 12. Thus, the sealing ring 54 forms a sealed front portion 62 of the space 52 around the front end 64 of the nozzle 12.

A melt passage 66 extends from a central inlet 68 in a cylindrical inlet portion 70 of the melt distribution manifold 10 and branches outwardly in the manifold 10 to convey melt to the melt channel 44 in each of the heated nozzles 12. As can be seen, the melt channel 44 has a central portion 72 extending from the rear end 36 of the nozzle 12 to a number of radial portions 74 which branch outwardly adjacent the front end 64 of the nozzle 12. Each nozzle 12 has a number of outwardly open threaded seats 76 spaced around a generally cylindrical portion 78 adjacent the front end 64 of the nozzle 12. A gate insert 80 made of a very heat conductive material such as a copper alloy having a inner end 82 and an outer end 84 is screwed into place in each of the threaded seats 76. The outer end 84 of each gate insert 80 extends outwardly or has a "reach" greater than the inside diameter of the sealing ring 54. Each gate insert 80 has a central bore 86 extending in alignment with one of the radial portions 74 of the melt channel 44 through the nozzle 12 and in alignment with a gate 88 extending through the mold 18 to a cavity 90.

As can clearly be seen in FIG. 2, the outer end 84 of each gate insert 80 is spaced from the wall 16 of the well 14 a predetermined distance "D" to form an opening 92 between them. Pressurized melt flows outwardly through this opening 92 during the initial injection cycle and partially solidifies in the sealed front portion 62 of the space 52 between the nozzle 12 and the surrounding wall 16 of the well 14. The distance "D" is made large enough to allow the melt to initially flow outwardly therethrough, but small enough to prevent the partially solidified melt in the front portion 62 of the space 52 being sucked back into the melt stream flowing into the cavity 90 during subsequent injection cycles. In the embodiment shown, the distance "D" is approximately 0.1 millimeters (0.004 inches), although it can vary somewhat depending upon the characteristics of the material being molded.

In use, the apparatus is first installed as shown in FIG. 1 and described above. The sealing ring 54 is mounted before the gate inserts 80 which allows the outer ends 84 of the gate inserts 80 to extend outwardly past the inside diameter of the sealing ring 54. Electrical power is then applied to the heating element 26 in the melt distribution manifold 10 and to the heating elements 42 in each of the nozzles 12 to heat them to a predetermined operating temperature. Pressurized melt is applied from a molding machine (not shown) to the central inlet 68 of the melt passage 66 according to a predetermined injection cycle. The melt flows through the melt distribution manifold 10, branches out through each nozzle 12, where it again branches out to flow through each gate insert 80 and aligned gate 88 into the cavities 90. During the initial injection cycle, some of the melt flows out through the openings 92 around the gates 88 to fill the sealed front portion 62 of the space 52 formed by the sealing ring 54. After the cavities 90 are filled and a suitable packing and cooling period has expired, the injection pressure is released and the melt conveying system is decompressed to avoid stringing through the open gates 88. The mold 18 is then opened to eject the molded products. After ejection, the mold 18 is closed and the cycle is repeated continuously with the cycle time dependent upon the size of the cavities 90 and the type of material being molded. If the type or colour of the material being molded is changed, the distance "D" is small enough to prevent the partially solidified material from the front portion 62 of the space 52 being sucked back into the stream of different coloured melt flowing into the cavity 90. In addition to reducing heat loss from the gate inserts 80 to the surrounding cooled mold 18, the greater spacing at the outer ends 84 of the gate inserts 80 has the advantage that the material which is trapped in the front portion 62 of space 52 itself provides insulation against heat loss and also helps to provide a seal against the escape of any melt past circular sealing ring 54.

While the description of the edge gated injection molding apparatus with each nozzle 12 having the combination of a sealing ring 54 and several gate inserts 80 has been given with respect to a preferred embodiment, it will be evident that various other modifications are possible without departing from the scope of the invention administered by those skilled in the art and as provided in the following claims.

The embodiments of the invention in which an exclusive property or privilege is claimed is defined as follows:

1. In an edge gated injection molding apparatus having at least one heated nozzle extending forwardly into a well in a cooled mold with an insulative space extending between at least part of the nozzle and the surrounding cooled mold, the well in the mold having a wall with a plurality of edge gates spaced therearound, each edge gate extending outwardly to a cavity in the mold, the at least one nozzle having a rear end, a front end, a melt channel, and a plurality of outwardly open seats adjacent the front end of the nozzle, each seat being radially aligned with one of the edge gates, the melt channel having a central portion extending from an inlet at the rear end of the nozzle toward the front end of the nozzle, the melt channel further having a plurality of radial portions, each radial portion branching outwardly from the central portion to one of the outwardly open seats so as to communicate with one of the edge gates, the improvement further comprising;

the combination of a sealing ring and a plurality of edge gate inserts, the sealing ring having a predetermined inside diameter and extending around the nozzle rearwardly from the outwardly open seats to seal a front portion of the space between the nozzle and the surrounding cooled mold against leakage of melt from said portion of said space, and each of the gate inserts being seated in one of the outwardly open seats spaced around the cylindrical portion of the nozzle, each gate insert having an inner end, an outer end, and a central bore extending therethrough from the inner end to the outer end of the gate insert, the central bore through the gate insert meeting one of the radial portions of the melt channel through the nozzle and extending in alignment with one of the edge gates leading to said cavity in said mold to convey a stream of melt therethrough during injection, the outer end of each gate insert extending outwardly past said inside diameter of the sealing ring, the outer end of each gate insert also being spaced a predetermined distance from the wall of the well in the mold to form an opening therebetween, the opening being large enough to allow pressurized melt to flow therethrough and at least partially to solidify in the sealed front portion of the space between the nozzle and the surrounding cooled mold during the initial injection cycle and small enough to prevent the partially solidified melt in the sealed front portion of the space being sucked back into the melt stream during subsequent injection cycles.

2. Injection molding apparatus as claimed in claim 1 wherein the outer end of each gate insert is spaced substantially 0.1 millimeters (0.004 inches) from the wall the well in the mold.

* * * * *